United States Patent [19]

Johnson et al.

[11] Patent Number: 4,681,750

[45] Date of Patent: Jul. 21, 1987

[54] PREPARATION OF AMORPHOUS, PRECIPITATED SILICA AND SILICEOUS FILLER-REINFORCED MICROPOROUS POLYMERIC SEPARATOR

[75] Inventors: Harlan B. Johnson, Rittman; Thomas G. Krivak, Akron; David A. Longhini, Uniontown, all of Ohio

[73] Assignee: PPG Industries, Inc., Pittsburgh, Pa.

[21] Appl. No.: 853,506

[22] Filed: Apr. 18, 1986

Related U.S. Application Data

[63] Continuation-in-part of Ser. No. 760,187, Jul. 29, 1985, abandoned, which is a continuation-in-part of Ser. No. 687,340, Dec. 28, 1984, abandoned.

[51] Int. Cl.$^4$ .................. H01M 2/14; C01B 33/12
[52] U.S. Cl. .................. 423/339; 429/252; 429/254; 106/287.34; 521/64
[58] Field of Search ............. 429/252, 254, 249–251; 423/339, 335; 521/50, 62, 64; 106/287.34, 288 B

[56] References Cited

U.S. PATENT DOCUMENTS

| | | | |
|---|---|---|---|
| 2,302,832 | 11/1942 | Behrman | 521/64 |
| 2,940,830 | 6/1960 | Thornhill | 423/339 |
| 3,351,495 | 11/1967 | Larsen et al. | 429/252 |
| 3,696,061 | 10/1972 | Selsor et al. | 521/64 |
| 4,024,323 | 5/1977 | Versteegh | 429/249 |
| 4,157,920 | 6/1979 | Wason et al. | 106/292 |
| 4,226,926 | 10/1980 | Goldberg | 429/252 |
| 4,237,083 | 12/1980 | Young et al. | 264/41 |
| 4,335,193 | 6/1982 | Doi et al. | 429/251 |

FOREIGN PATENT DOCUMENTS

| | | |
|---|---|---|
| 1076650 | 3/1960 | Fed. Rep. of Germany . |
| 1467019 | 9/1969 | Fed. Rep. of Germany . |
| 2610207 | 9/1976 | Fed. Rep. of Germany . |

OTHER PUBLICATIONS

Pamphlet on Pigments, No. 53, Degussa Company.

*Primary Examiner*—Anthony Skapars
*Attorney, Agent, or Firm*—Irwin M. Stein

[57] ABSTRACT

Precipitated amorphous silica useful for manufacturing microporous battery separators is prepared by establishing an aqueous solution of alkali metal silicate having an alkali metal oxide concentration of (a) from 2.1–2.6 grams per liter and a temperature of from about 179° F. to 186° F., or (b) from 5.6 to 7.2 grams per liter and a temperature of from 190° to 198° F.; adding from (a) 14.5 to 19 times or (b) 2 to 5 times respectively the amount of alkali metal silicate initially present in the initial aqueous solution simultaneously with acidifying agent, e.g., sulfuric acid, to the initial aqueous solution while maintaining the initial alkali metal oxide concentration therein substantially constant; reducing the pH of the resulting slurry to from 8 to 9; ageing the slurry at precipitation temperatures for from 15 to 90 minutes; reducing the pH of the aged slurry to from 3.8 to 4.7 and then recovering, e.g., separating, the silica from its entraining slurry, washing the recovered silica, and drying the washed precipitated silica. Optionally, the recovered and dried silica is milled after drying to produce a product having a median agglomerate particle size of from 6 to 15 micrometers.

64 Claims, No Drawings

PREPARATION OF AMORPHOUS, PRECIPITATED SILICA AND SILICEOUS FILLER-REINFORCED MICROPOROUS POLYMERIC SEPARATOR

CROSS REFERENCE TO RELATED APPLICATIONS

This application is a continuation-in-part application of copending Application Ser. No. 760,187, filed July 29, 1985, now abandoned of the same title, which, in turn, is a continuation-in-part application of Application Ser. No. 687,340, filed Dec. 28, 1984, now abandoned.

DESCRIPTION OF THE INVENTION

The present invention is directed to siliceous filler-containing battery separators and to the novel siliceous fillers used to prepare the battery separator. In commonly used electric storage batteries, such as the well-known 12-volt battery employed in automobiles, separators are placed between battery plates of opposite polarity to prevent the two plates from touching each other and causing an electrical short. The separator is typically a microporous article fabricated from a polymeric material, e.g., natural or synthetic rubber, or a polyolefin. The separator may have a backing material of, for example, a non-woven web. The pores of the separator should be as small as possible since this reduces the danger of active materials being forced through or growing through the separator, thereby causing an electrical short.

The separator should also have a low electrical resistance in order to maximize the power output from the battery. Lower electrical resistance can be obtained by reducing the overall thickness of the separator; however, thinner separators are more subject to corrosion and other physical factors affecting the service life of the separator.

Certain siliceous fillers have been used to prepare microporous battery separators. See, for example, U.S. Pat. No. 2,302,832, which describes the use of a silica hydrogel in a rubber binder; U.S. Pat. No. 3,351,495, which describes synthetic and natural zeolites, precipitated metal silicates, such as calcium silicate, and silica gels as the inorganic filler and extender for separators of high molecular weight polyolefins; and U.S. Pat. Nos.3,696,061, 4,226,926, and 4,237,083, which describe the use of finely divided, precipitated amorphous silica, such as Hi-Sil ® 233 siliceous pigment, in microporous battery separators. Hi-Sil ® 233 amorphous silica is prepared by uninterrupted acidification, e.g., with carbonic acid, of an aqueous solution of sodium silicate to produce a finely-divided powder having a reported BET surface area of between 140 and 160 square meters per gram. See, for example, U.S. Pat. No. 2,940,830.

Amorphous precipitated silica is used as the vehicle for introducing porosity into and for reinforcing polymeric material utilized to fabricate the battery separator. Such precipitated silica is highly absorbent and can absorb a substantial quantity of an aqueous or organic liquid while remaining free flowing. In practice, the amorphous precipitated silica is loaded with a liquid of choice, e.g., water or oil, and then blended with the polymeric material. The liquid absorbed by the silica filler is subsequently removed to impart porosity to the polymer.

It has now been discovered that certain novel amorphous precipitated silicas permit fabrication of battery separators having reduced electrical resistance compared to separators prepared with conventional amorphous precipitated silica, such as the aforementioned Hi-Sil ® 233 silica. In addition, such precipitated silicas provide reinforcement and strength to the polymeric material. Further, the agglomerated particles of precipitated silica described herein possess a structure that resists breakage caused by the mechanical stresses to which the silica is subjected during production of the separator.

DETAILED DESCRIPTION OF THE INVENTION

Amorphous precipitated silica used to produce reinforced microporous polymeric battery separators of the present invention are prepared by a process involving a sequence of several steps in which the process conditions are carefully controlled. In the first step of the process, a first aqueous solution of alkali metal silicate is established in a precipitation vessel equipped with agitation means. In one embodiment, the alkali metal oxide concentration of the first aqueous alkali metal silicate solution is between about 2.1 and 2.6 grams per liter (gpl), e.g., between 2.1 and 2.2 gpl. In a second embodiment, the alkali metal oxide concentration of the first aqueous alkali metal silicate solution is from about 5.6 to 7.2, e.g., 5.6 to 6.3, grams per liter.

The temperature to which the first alkali metal silicate solution is heated for the precipitation step will vary with the initial alkali metal oxide concentration used. In the first embodiment, the solution may have a temperature of from about 179° F. (82° C.) to 186° F. (85° C.), e.g., 182–183° F. (83° C.). In the second embodiment, the solution temperature may be higher, i.e., a temperature of between about 190° F. (88° C.) and about 198° F. (92° C.), e.g., about 192–193° F. (89° C.).

Further alkali metal silicate and acidifying agent are then added slowly and simultaneously to the first aqueous alkali metal silicate solution contained in a precipitation vessel while agitating the liquid reaction medium. Further alkali metal silicate and acidifying agent are added at a rate sufficient to maintain the alkali metal oxide concentration in the first aqueous solution at substantially the same level. The degree of agitation should be sufficient to provide substantially complete dispersion of the added alkali metal silicate and acidifying agent. In the first embodiment, further alkali metal silicate in amounts equal to from about 14.5 to about 19, e.g., about 15–17, typically 16, times the amount of alkali metal silicate present in the first aqueous alkali metal silicate solution is added thereto. In the second embodiment, further alkali metal silicate in amounts equal to from about 2 to about 5, preferably about 2 to 3, times the amount of alkali metal silicate present in the first aqueous solution is added to the first aqueous solution.

After completing addition of the aforedescribed further alkali metal silicate to the precipitation vessel, additional acidifying agent is added to the resulting slurry until the pH thereof is from about 8 to 9, e.g., about 8.5. This slightly alkaline slurry is then aged at for from about 15 to about 90, preferably from about 30 to 60, e.g., 45, minutes at the then existing temperature of the liquid reaction medium. In the case of the first embodiment, aging may be at temperatures of from about 176° F. (80° C.) to about 186° F. (83° C.); whereas in the second embodiment, aging may be at temperatures between about 188° F. (87° C.) and about 198° F. (92° C.). Subsequent to the aging step, additional acidifying agent is added to the aged slurry until the pH thereof is acidic, e.g., from about 3.8 to about 4.7. Sufficient acidifying agent is added so that the pH of a 5 weight percent slurry of the final recovered and dried silica product is about neutral, i.e., has a pH of about 7, e.g., between about 6.5 and 7.3.

The precipitated silica in the acidified slurry is then recovered, washed and dried. Recovery of the precipitated silica may be by any conventional liquid-solid separating means, e.g., drum filters, plate and frame filters, centrifuge etc. The precipitated silica is washed with water or other suitable aqueous washing fluid until the residual alkali metal salt content of the silica is less than about 2 or 2.5 weight percent, e.g., 0.5–1.5 weight percent. The washed silica may be dried by conventional techniques, e.g., rotary or spray drying. If necessary, the dried product can be milled to break up large agglomerates to obtain a finely divided white product in which the median aggregate particle size is between about 6 and about 16, preferably between about 8 and about 12, microns, as measured by a Coulter counter.

Any suitable-water soluble alkali metal silicate may serve as a source of the silica. Such alkali metal silicate may contain from 1 to 5 moles of $SiO_2$ per mole of alkali metal oxide ($M_2O$). Sodium silicate containing from 2 to 4 moles $SiO_2$ per mole of $Na_2O$ is a widely available and used material and hence is preferred. Typically, the $Na_2O:SiO_2$ ratio is about 1:3.3. Other alkali metal silicates, such as lithium or potassium silicate, may also be used.

The first aqueous solution of alkali metal silicate, e.g., the solution containing from about 5.6 to 7.2 grams per liter of alkali metal oxide, is typically prepared by adding an aqueous alkali metal silicate solution, e.g., sodium silicate having a $Na_2O/SiO_2$ ratio of 1/3.3, to a predetermined quantity of water heated to, for example, between about 190° F. (80° C.) and about 198° F., (92° C.) e.g., about 195° F. (91° C.), in amounts sufficient to establish the desired concentration. This solution is agitated to assure efficient mixing of the alkali metal silicate added to the water. Agitation is maintained during addition of the further alkali metal silicate and acidifying agent to the first aqueous solution so as to provide an adequate dispersion of the added reactants within the precipitation vessel.

In the second step of the process, further alkali metal silicate and acidifying agent are then added slowly and simultaneously to the first aqueous solution. These are added in relative amounts and at rates sufficient to maintain the alkali metal oxide concentration in the first aqueous solution substantially constant, i.e., at substantially its initial value. Thus, the amount of acidifying agent added to the vessel containing the first aqueous alkali metal silicate solution will be slightly less than the stoichiometric amount required for the further alkali metal silicate added to the precipitation vessel so as to compensate for the effect of dilution by the alkali metal silicate and acidifying agent added during the second step. The amount of further alkali metal silicate added will vary depending on the alkali metal oxide concentration in the first aqueous solution. As described, when the initial $M_2O$ concentration is from 2.1 to 2.6 gpl, the amount of alkali metal silicate added may vary from 14.5 to 19 times the amount present in the first aqueous solution; and when the initial $M_2O$ concentration is from 5.6 to 7.2 gpl, the amount of alkali metal silicate added may vary from about 2 to 5, preferably 2 to 3, times the amount of alkali metal silicate initially present in the first aqueous solution.

The further alkali metal silicate is typically added over a period of from about 60 to 150 minutes, e.g., about 90 minutes. The particular addition time will, of course, depend on the multiple of further alkali metal silicate added. During addition of the further alkali metal silicate and acidifying agent, the temperature of the resulting slurry in the precipitation vessel is maintained at about the temperature of the starting alkali metal silicate aqueous solution, although some slight cooling may occur. The further alkali metal silicate added to the precipitation vessel will typically have the same alkali metal cation as the cation of the starting alkali metal silicate solution, e.g., sodium.

Acidifying agent used to neutralize the alkali metal silicate typically is carbonic acid or an inorganic mineral acid, e.g., hydrochloric acid or sulfuric acid. Different acids may be used in the various process steps if desired. The carbonic acid acidifying agent can be furnished by introducing carbon dioxide into the alkali metal silicate aqueous solution. Acidifying agent is added gradually to the precipitation vessel and the rate and amount required is determined by the rate and the amount of further alkali metal silicate used. Control of the rate of addition of acidifying agent can be achieved by monitoring the pH of the alkali metal silicate solution or slurry in such vessel. The pH can be measured by any convenient commercially available pH meter.

After completing addition of the further alkali metal silicate and acidifying agent to the precipitation vessel, additional acidifying agent is added slowly, and preferably at the same rate used during the preceding (second) process step until the pH of the siliceous slurry is between about 8 and about 9, i.e., slightly alkaline, e.g., about 8.5. Thereupon, the slurry is agitated slowly and allowed to age substantially at the temperature that the slurry possesses following completion of the addition of the further alkali metal silicate and acidifying agent for from about 15 to about 90 minutes, usually between about 30 and about 45 minutes. Aging temperatures will vary depending on the embodiment practiced. In the case of the first embodiment, such temperatures may vary between about 176° F. (80° C.) and 186° F. (83° C.); whereas, in the second embodiment, temperatures between about 188° F. (87° C.) and 198° F. (92° C.) may be involved. Following the aging step, additional acidifying agent is added slowly with agitation to the slurry in amounts sufficient to provide a dried product that is characterized by an essentially neutral pH (5 weight percent slurry), i.e., a pH of about 7, e.g., between about 6.5 and 7.3. Typically, sufficient acid is added to the slurry until the pH thereof reaches between about 3.8 and about 4.7, e.g., between about 4.3 and about 4.7. Slurries acidified within such a range will typically result in a final product exhibiting an essentially neutral pH.

The precipitated silica in the slurry is recovered from the slurry by any suitable solid-liquid separating means such as a filter press, drum filter, centrifuge, etc. The resulting filter cake is then usually washed with water to remove residual water soluble alkali metal inorganic salts, e.g., sodium chloride and/or sodium sulfate. Silica prepared by the above-described method using sulfuric acid as the acidifying agent will typically have a sodium chloride content of less than about 0.10 weight percent, e.g., less than 0.07 weight percent, a sodium sulfate content of less than about 2.5, preferably less than 2.0, weight percent, and a sodium oxide content less than about 1.5 weight percent, e.g., preferably not more than about 1.0 weight percent. The aforesaid values can be determined by X-Ray fluorescence spectroscopy.

Following washing, the filter cake may be dried by any suitable drying means, e.g., spray drying, tray and compartment drying, or rotary drying. The particular drying means used may effect the physical properties of the silica product, e.g., the oil absorption. Hence, the drying means used should be considered when determining what final properties are desired. The dried silica may be used as recovered from the drying step if the particles are sufficiently finely-divided, e.g., such as product recovered from a spray dryer. If, however, the drying step produces large, hard agglomerates or cemented particles, the product can be subjected to a milling or grinding step to produce a more finely-divided product having the appropriate aggregate particle size.

The dried silica is a white, fluffy, pulverulent powder that is dry to touch. Despite appearing dry, the silica normally contains water, e.g., between about 2 and 8 percent "free water" by weight. Free water is that water which is removed from the silica by heating it at 105° C. for 24 hours. The silica also contains "bound water", which refers to that water removed by heating the silica at ignition temperature, i.e., 1000° C. to 1200° C. for an extended period, e.g., 24 hours. Bound water can constitute between about 2 and 6 percent of the silica. Chemically, the finely-divided, amorphous precipitated hydrated silica contains at least 85, preferably at least 90 and more preferably 93 to 97 weight percent $SiO_2$ on an anhydrous basis, i.e., not including free water.

The physical properties of the precipitated silicas produced by the embodiments of the above-described process will vary and depend on the particular embodiment practiced. In the case of the first embodiment, the silica produced will commonly have a BET surface area of from about 160 to about 190, e.g., about 175 square meters per gram ($m^2/g$) and an oil absorption of from about 190 to about 210, e.g., about 200 milliliters of oil per one hundred grams of silica. In addition, such silica will commonly have a water absorption value of from about 150 to about 180 milliliters per 100 grams of silica. Water absorption values may however range from about 140 to about 200 milliliters per 100 grams of silica. The median agglomerate particle size of the silica product of the first embodiment will be between about 12 and 15 microns (micrometers), as measured by a Coulter counter. The bulk density is from about 14 to 16 pounds per cubic foot (22.4–25.6 kg/$m^3$), e.g., 15 pounds per cubic foot (24 kg/$m^3$). Precipitated silica prepared in accordance with the second embodiment of the above described process will typically have a BET surface area of between about 130 and 180, e.g., about 150, square meters per gram ($m^2/g$) and an oil absorption of between about 200 and 270, e.g., more typically between about 230 and about 260, milliliters of oil per hundred grams of silica. In addition, such silica will typically have a water absorption of between about 160 and about 180 milliliters per 100 grams of silica and a median agglomerate particle size of between about 6 and about 20, preferably between about 12 and 16 microns (micrometers), as measured by a Coulter counter. The bulk density is from about 8 to 12 pounds per cubic foot (12.8–19.2 kg/$m^3$), e.g., 10 pounds per cubic foot (16 kg/$m^3$).

The surface area of finely-divided silica can be determined by the method of Brunauer, Emmett and Teller, J. Am. Chem. Soc., 60, 309 (1938). This method, which is often referred to as the BET method, measures the absolute surface area of the material by measuring the amount of gas adsorbed under special conditions of low temperature and pressure. The BET surface areas reported herein were obtained using nitrogen as the gas adsorbed and liquid nitrogen temperatures ($-196°$ C.) and at a 0.2 relative pressure. Oil absorption and water absorption values are the volumes of dibutylphthalate oil and water respectively necessary to wet 100 grams of the silica. These values can be obtained using a method like the method described in ASTM D2414-65.

The specific volume of precipitated silica prepared by the first embodiment will be at least about 3 cubic centimeters per gram ($cm^3/g$) when compacted with an applied pressure of 17 pounds per square inch (psi) (117 kPa), and will be at least about 2 $cm^3/g$ when compacted at an applied pressure of 280 psi (1931 kPa). The specific volume of precipitated silica prepared by the second embodiment of the abovedescribed process will be at least 3.5 cubic centimeters per gram ($cm^3/g$), e.g., 3.5–4.7 $cm^3/g$ when compacted with an applied pressure of 17 pounds per square inch (psi) (117 kPa), and will be at least 2.5 $cm^3/g$, e.g., 2.5–2.7 $cm^3/g$ when compacted at an applied compaction pressure of 280 psi (1931 kPa).

Compaction of precipitated silica and measurement of the specific volume thereof as a function of the applied pressure may be used to discriminate between different silicas. For example, the specific volume of a silica (which is a value obtained by dividing the sample volume at a given applied pressure by the sample weight) may be correlated to other physical properties of the silica, such as its porosity. Different silicas exhibit unique compaction behavior as the applied pressure is increased, thereby gradually eliminating the silica's porosity.

Specific volume measurements, as reported herein, may be calculated using the loading curve generated by an Instron mechanical testing machine, the sample weight, and dimensions of the die chamber (and hence the sample volume) at any given applied pressure.

Amorphous precipitated silicas prepared by the embodiments of the above-described process are finely-divided particulate solid materials in the form of reinforced flocs or agglomerates of smaller particles of siliceous material. As initially precipitated, amorphous silica is composed of ultrafine, solid spherical particles having an average diameter of about 0.02 microns, which appear as strands of beads. These strands collect and intertwine to form a loose aggregate structure with open porosity. In the present process, the valleys and gaps, i.e., the interstices, of the individual strands are filled in with further silica particles to produce strands having a smoother, e.g., more rod-like, appearance. These reinforced, intertwined strands provide a final agglomerate structure which is more resistant to the mechanical forces, i.e., resists being broken down into smaller aggregate structures, applied to it during preparation of the battery separator than non-reinforced amorphous precipitated silica.

Between about 10 and about 90 weight percent, basis the polymeric material, of the amorphous precipitated silica described hereinabove is used to produce the reinforced microporous polymeric battery separator.

More particularly, between about 20 and 75, e.g., between 30 and 60, weight percent of the silica is so used.

The polymeric material into which the silica is incorporated to prepare the microporous battery separator can be any of the conventional natural and synthetic polymeric materials conventionally used to fabricate battery separators. Among such materials, there can be mentioned natural rubber, styrene-butadiene rubber, nitrile-butadiene rubber, polyisoprene, high molecular weight olefins such as polyethylene, polypropylene, polybutene, ethylene-propylene copolymers, ethylene-butene copolymers, propylene-butene copolymers, ethylene-propylene-butene copolymers, polyvinyl chloride and vinyl chloride-vinyl acetate copolymers. Mixtures of such materials have also been used to prepare battery separators.

Other conventional materials added to the polymeric material, such as plasticizers, antioxidants, wetting agents, carbon black and curing agents, e.g., sulfur, for rubbery polymeric materials may also be added to the composition used to prepare the battery separator.

Battery separators incorporating the above-described precipitated silica can be prepared in accordance with known techniques for preparing such articles. A typical procedure for preparing a battery separator utilizing a curable rubber is described in U.S. Pat. No. 4,226,926. In that patent, the siliceous filler is rehydrated to levels of between 65 and 75 percent by admixing the siliceous filler with water. The resulting free flowing rehydrated silica powder is admixed with the polymeric material, e.g., in a Banbury mixer. Thereafter, the mixture (including any additional additives required for curing the polymeric particle) is milled on a 2-roll mill to produce a milled sheet. The milled sheet is soaked in hot water and then calendered for contours. Optionally a backing such as paper or a heat-bonded mat is added to the milled sheet. The calendered sheet is then cut into appropriate sizes.

Another similar procedure is described in U.S. Pat. No. 3,351,495. There, the polymeric material, e.g., a polyolefin having a molecular weight of at least 300,000, is blended with the inert filler, e.g., silica, and a plasticizer. The blend, which may also contain conventional stabilizers or antioxidants, is molded or shaped, e.g., by extrusion, calendering, injection molding and/or compression, into sheets. Plasticizer is removed from the sheet by soaking the sheet in a suitable solvent, e.g., chlorinated hydrocarbons for a petroleum oil plasticizer, and water, ethanol, acetone, etc. for a polyethylene glycol plasticizer. The solvent is then removed and the sheet dried.

A still further procedure is described in U.S. Pat. No. 4,237,083 wherein a blend of polyolefin, silica and liquid, water-insoluble plasticizer are blended and then formed, e.g., by extrusion into a sheet. The extruded sheet may have ribs or dimples on one or both sides. The extruded sheet may then be calendered to reduce its thickness. The sheet may be embossed during or after calendering to provide ribs, dimples or other desired embossed configurations. The sheet is then contacted with water so as to remove an amount of plasticizer sufficient to render the sheet microporous.

The present invention is more particularly described in the following examples which are intended as illustrative only since numerous modifications and variations therein will be apparent to those skilled in the art.

Example 1

Sodium silicate having an $Na_2O:SiO_2$ ratio of about 1:3.3 was added with agitation to water heated to 192° F. in a precipitation vessel until the $Na_2O$ concentration in this first aqueous solution was 7.0±0.2 grams per liter. While maintaining the first aqueous solution at 192° F., three times the initial volume of sodium silicate and concentrated sulfuric acid were added with agitation over 90 minutes to the precipitation vessel. The rate of acid addition was calculated to maintain the $Na_2O$ concentration in the vessel at about 7.0 grams per liter. When addition of the three additional volumes of sodium silicate was completed, acid addition was continued until the pH of the resulting slurry was about 8.5. Acid addition was then interrupted for 45 minutes to permit the slurry to age. At the end of the ageing period, concentrated sulfuric acid was added to lower the pH of the slurry to about 4.6. The precipitated silica was filtered and the filter cake washed with water to reduce the level of sodium sulfate by-product salt in the cake to less than 2.5 weight percent. The washed filter cake was refluidized and spray dried. The dried silica was then milled. The product was submitted for physical analysis. Results are tabulated in Table I. The silica was also analyzed for chloride ion, sulfate ion, and sodium ion by X-Ray fluorescence spectroscopy using a model XRD-410 automated X-Ray spectrograph. The spectrograph employs a dual target X-Ray tube (tungsten/chromium) operating at 60 kilovolts and 50 milliamperes for excitation of the minor and trace element spectra.

EXAMPLE 2

The process of Example 1 was repeated except that the temperature of precipitation was 195° F. Results of analyses of the silica thereby produced are tabulated in Table I.

EXAMPLE 3

Sodium silicate having a $Na_2O:SiO_2$ ratio of about 1:3.3 was added with agitation to water heated to 182° F. in a precipitation vessel until the $Na_2O$ concentration in this first aqueous solution was about 2.1 grams per liter. While maintaining the first aqueous solution at 182° F., sixteen times the initial volume of sodium silicate and concentrated sulfuric acid were added with agitation over 90 minutes to the precipitation vessel. The rate of acid addition was calculated to maintain the $Na_2O$ concentration in the vessel at about 2.1 grams per liter. When addition of the sixteen additional volumes of sodium silicate was completed, addition of sodium silicate to the precipitation vessel was terminated and acid addition was continued at half the previous rate until the pH of the resulting slurry was about 8.5. Acid addition was then interrupted and the slurry aged while agitating the slurry slowly for 45 minutes. At the end of the ageing period, concentrated sulfuric acid was added to lower the pH of the slurry to about 3.8. The precipitated silica was filtered and the filter cake washed with water to reduce the level of sodium sulfate by-product salt in the cake to less than 2.5 weight percent. The washed filter cake was rotary dried. The dried silica was then milled. The product was submitted for physical analysis. Results are tabulated in Table I. The values reported in Table I are average values.

TABLE I

| Silica | OA[1] | H₂O/A[2] | S.A.[3] | C.C.[4] | F.W.[5] | NaCl, % | Na₂SO₄, % | Na₂O, % |
|---|---|---|---|---|---|---|---|---|
| Example 1[a] | 253[c] | 176[c] | 149 | 12 | 6.3 | .03 | 1.76 | 1.37 |
| Example 2 | 240 | 158 | 133 | 9 | N.D. | .06 | 1.35 | 0.61 |
| Hi-Sil 233[b] | 200 | 153 | 150 | 13 | 6 | .07 | 1.8 | 1.0 |
| Example 3 | 199 | 168 | 176 | 15 | 6.6 | .03 | 1.15 | 1.0 |

[1] OA = oil absorption, ml/100 grams
[2] H₂O/A = Water absorption, ml/100 grams
[3] S.A. = BET surface area, m²/gram
[4] C.C. = Coulter counter aggregate particle size, micrometers
[5] F.W. = Free water loss at 105° C., percent
[a] Average of 5 values
[b] Typical analysis
[c] Average of 4 values
N.D. - Not Determined

EXAMPLE 4

The precipitated silica of Example 1 and a Hi-Sil 233 precipitated silica were used to prepare battery separators utilizing a curable rubber. The electrical resistance of samples of such battery separators was measured in sulfuric acid (Specific Gravity 1.223) at about room temperature after soaking in the acid for 24 hours to eliminate air bubbles using a Model 9100-2 Palico test system including the Palico 9000–9100 bath.

The electrical resistance (milliohm - in ²/mil of thickness) of the battery separator prepared with the Hi-Sil 233 type pigment was found to be 5.00 (average of two samples). By comparison, the electrical resistance of the battery separator prepared with the siliceous filler of Example 1 was 3.77 (average of three values). This represents a reduction in electrical resistance of 1.23 or about 24 percent.

EXAMPLE 5

The precipitated silica of Example 3 and an Ultrasil ® UN-3 silica were used to prepare battery separators in accordance with the procedure described in U.S. Pat. No. 3,351,495. The polymer used was ultra high molecular weight polyethylene. The initial composition comprised about 11 weight percent of the polymer, about 35 weight percent silica and about 54 weight percent plasticizer oil. In the preparation using Ultrasil ® UN-3 silica, a small amount (100 grams) each of an antioxidant and a lubricant were also added to the initial composition. The electrical resistance of such battery separators was measured using the same method described in Example 4. The electrical resistance (milliohm-in²/mil of thickness) of the battery separator prepared with the silica of Example 3 was found to be 1.0 whereas the electrical resistance of the battery separator prepared with the Ultrasil ® UN-3 silica was found to be 1.7. A battery separator prepared in accordance with the procedure described in U.S. Pat. No. 3,351,495 utilizing silica prepared in accordance with the process described in Example 1 was found to have an electrical resistance of 0.75 milliohm-in²/mil.

EXAMPLE 6

The radius of the pores in the silica aggregate, as distinguished from the microporosity of the ultimate silica particle, present in battery separators prepared with silicas prepared by the process of Example 1 and Example 3, and with Ultrasil ® UN-3 was measured by mercury porosimetry using an Autoscan-33 Porosimeter (Quantachrome Corp.). The pore radii of the silicas in battery separators utilizing silicas prepared by the process of Example 1 and Example 3, and with Ultrasil ® UN-3 were found respectively to be 140, 114 and 86 angstroms.

EXAMPLE 7

Two samples of precipitated silica sold for use in rubber reinforcement, seven samples of precipitated silica (A–G) prepared in accordance with Example 1, and one sample of precipitated silica (H) prepared in accordance with Example 3 were loaded into a cylindrical steel die having an inside diameter of 1.25 inches (3.18 centimeters) and a height of 2.5 inches (6.35 centimeters) on an Instron Model TT mechanical testing machine. The die was filled completely with the silica and gently vibrated to ensure that the die cell was uniformly filled. The loaded silica was continuously compacted at a machine crosshead velocity of 0.02 inch/minute (0.05 centimeter/minute) in the double action mode. A dial indicator measured plunger displacements. The silicas were compacted to a load near 10,000 pounds (4536 kg), the capacity of the machine, after which the compacted silica samples were unloaded and accurately weighed. The specific volume of each of the silicas was calculated at 17 psi (117 kPa), 280 psi (1931 kPa), 4500 psi (31 MPa), and 8000 psi (55 MPa). Results are tabulated in Table I.

TABLE II

| Silica | Specific Volume Compaction Pressure (PSI) | | | |
|---|---|---|---|---|
| | 17 | 280 | 4500 | 8000 |
| Hi-Sil 233 | 2.967 | 2.195 | 1.092 | 0.851 |
| Hi-Sil 260[a] | 3.361 | 2.504 | 1.362 | 1.131 |
| Ultrasil ® VN-3[b] | 3.155 | 2.409 | 1.270 | 1.112 |
| A | 4.672 | — | 1.291 | 1.017 |
| B | 3.579 | 2.489 | 1.179 | 0.913 |
| C | 4.018 | 2.518 | 1.152 | 0.187 |
| D | 3.728 | 2.608 | 1.325 | 1.102 |
| E | 3.700 | 2.664 | 1.320 | 1.108 |
| F | 3.688 | 2.611 | 1.315 | 1.103 |
| G | 3.967 | 2.713 | 1.351 | 1.061 |
| H | 3.135 | 2.281 | 1.278 | 1.021 |

[a] Precipitated silica with physical properties like Hi-Sil ® 233.
[b] Silica Product of Degussa Corp. having the following reported properties: BET surface area - 170 m²/g; DBP Oil Absorption - 225 ml/100 g; bulk density - 15 lb/ft³.

The data of Table II show that a precipitated silica prepared by the process of Example 1, i.e., silica samples A–G, have higher specific volumes than the two commercial grades of silica when compacted at 17 psi (117 kPa). Such precipitated silica, therefore has higher porosity, which contributes to the improved performance of battery separators prepared with such silicas. As the applied pressure is increased and the porosity of the silica is eliminated, the specific volumes are lowered accordingly and the differences between the commercial silica samples and those prepared by the above-described process are reduced.

While the invention has been described in detail with respect to certain embodiments thereof, it is to be understood that the invention is not intended to be limited to such details except as and insofar as they appear in the appended claims.

We claim:

1. In a siliceous filler-reinforced microporous polymeric battery separator, the improvement wherein the siliceous filler comprises amorphous, precipitated silica prepared by the sequential steps of:
   (a) establishing an agitated aqueous solution of alkali metal silicate having (1) an initial alkali metal oxide concentration of from about 2.1 to 2.6 grams per liter and a temperature of from about 179° F. to 186° F., or (2) an initial alkali metal oxide concentration of from about 5.6 to 7.2 grams per liter and a temperature of between about 190° F. and about 198° F.,
   (b) adding slowly to the said aqueous solution further alkali metal silicate in amounts of (1) from about 14.5 to about 19 times, or (2) from about 2 to about 5 times, basis the aforesaid respective initial alkali metal oxide concentration, the amount of alkali metal silicate initially present in the aqueous solution while simultaneously adding acidifying agent to the said aqueous solution in amounts sufficient to maintain the alkali metal oxide concentration in the aqueous solution at substantially its initial level, thereby to form an aqueous slurry of precipitated silica,
   (c) adding additional acidifying agent to the slurry of step (b) until the pH thereof is from about 8 to about 9,
   (d) ageing the slurry of step (c) at (1) between about 176° F. and 186° F., or (2) between about 188° F. and 198° F., basis the aforesaid respective initial temperatures of the initial aqueous alkali metal silicate solution, for from about 15 to 90 minutes, and thereafter
   (e) adding additional acidifying agent to the slurry of step (d) in amounts such that the final solid silica product has an essentially neutral pH.

2. The battery separator of claim 1 wherein the alkali metal silicate is sodium silicate.

3. The battery separator of claim 2 wherein the acidifying agent is selected from the group consisting of carbonic acid, hydrochloric acid and sulfuric acid.

4. The battery separator of claim 3 wherein the amount of additional acidifying agent added to the slurry of step (d) is sufficient to reduce the pH thereof to from about 3.8 to about 4.7.

5. The battery separator of claim 3 wherein the precipitated silica of step (e) is recovered from the slurry, washed to a residual alkali metal salt content of less than about 2.5 weight percent and dried.

6. The battery separator of claim 5 wherein the washed precipitated silica is dried by spray drying or rotary drying.

7. The battery separator of claim 6 wherein the dried silica is milled to produce a product having a median agglomerate particle size of between about 12 and about 16 micrometers.

8. In a siliceous filler-reinforced microporous polymeric battery separator, the improvement wherein the siliceous filler comprises amorphous, precipitated silica prepared by the sequential steps of:
   (a) establishing an aqueous solution of alkali metal silicate having an initial alkali metal oxide concentration of from about 2.1 to 2.6 grams per liter and a temperature of between about 179° F. and about 186° F.,
   (b) adding slowly to the said aqueous solution further alkali metal silicate in amounts of from about 14.5 to about 19 times the amount of alkali metal silicate initially present in the aqueous solution while simultaneously adding acidifying agent to the said aqueous solution in amounts sufficient to maintain the alkali metal oxide concentration in the aqueous solution at substantially its initial level, thereby to form an aqueous slurry of precipitated silica,
   (c) adding additional acidifying agent to the slurry of step (b) until the pH thereof is from about 8 to about 9,
   (d) ageing the slurry of step (c) at between about 176° F. and 186° F. for from about 15 to 90 minutes, and thereafter
   (e) adding additional acidifying agent step (d) in amounts such that the final solid product has an essentially neutral pH.

9. The battery separator of claim 8 wherein the alkali metal silicate is sodium silicate.

10. The battery separator of claim 9 wherein the acidifying agent is selected from the group consisting of carbonic acid, hydrochloric acid and sulfuric acid.

11. The battery separator of claim 10 wherein the amount of additional acidifying agent added to the slurry of step (d) is sufficient to reduce the pH thereof to from about 3.8 to about 4.7.

12. The battery separator of claim 11 wherein the precipitated silica of step (e) is recovered from the slurry, washed to a residual alkali metal salt content of less than about 2.5 weight percent and dried.

13. The battery separator of claim 12 wherein the washed precipitated silica is dried by spray drying or rotary drying.

14. The battery separator of claim 9 wherein the initial alkali metal oxide concentration is between about 2.1 and 2.2 grams per liter, the temperature thereof is from about 182° F. to about 183° F., the amount of further alkali metal silicate added in step (b) is from about 15 to 17 times the amount of alkali metal silicate initially present in the aqueous solution, and the acidifying agent is sulfuric acid.

15. The battery separator of claim 14 wherein the precipitated silica is aged in step (d) for from about 30 to 60 minutes, the precipitated silica of step (e) is recovered and washed to a residual sulfate salt content of less than about 2.0 weight percent, and the washed silica dried 16. The battery separator of claim 15 wherein the washed silica is dried in a rotary furnace and milled to provide a product having a median agglomerate particle size of between about 12 and 15 micrometers.

17. In a siliceous filler-reinforced microporous polymeric battery separator, the improvement wherein the siliceous filler comprises amorphous, precipitated silica prepared by the sequential steps of:
   (a) establishing an aqueous solution of alkali metal silicate having an initial alkali metal oxide concentration of from about 5.6 to 7.2 grams per liter and a temperature of between about 190° F. and about 198° F.,
   (b) adding slowly to the said aqueous solution further alkali metal silicate in amounts of from about 2 to about 5 times the amount of alkali metal silicate initially present in the aqueous solution while simultaneously adding acidifying agent to the said aqueous solution in amounts sufficient to maintain the alkali metal oxide concentration in the aqueous solution at substantially its initial level, thereby to form an aqueous slurry of precipitated silica, (c) adding additional acidifying agent to the slurry of step (b) until the pH thereof is from about 8 to about 9.

(d) ageing the slurry of step (c) at between about 188° F. and 198° F. for from about 15 to 90 minutes, and thereafter (e) adding additional acidifying agent to the slurry of step (d) in amounts such that the final solid product has an essentially neutral pH.

18. The battery separator of claim 17 wherein the alkali metal silicate is sodium silicate.

19. The battery separator of claim 18 wherein the initial alkali metal oxide concentration is between about 5.6 and 6.3 grams per liter 20. The battery separator of claim 18 wherein the initial alkali metal oxide concentration is about 7.0 grams per liter.

21. The battery separator of claim 19 wherein the temperature of the aqueous alkali metal silicate solution of step (a) is about 195° F.

22. The battery separator of claim 19 wherein the amount of further alkali metal silicate added in step (b) is from about 2 to 3 times the amount of alkali metal silicate initially present in the solution of step (a).

23. The battery separator of claim 18 wherein the acidifying agent is carbonic acid, hydrochloric acid or sulfuric acid.

24. The battery separator of claim 22 wherein the acidifying agent is carbonic acid, hydrochloric acid or sulfuric acid.

25. The battery separator of claim 24 wherein the amount of additional acidifying agent added to the slurry of step (d) is sufficient to reduce the pH thereof to from about 3.8 to 4.7.

26. The battery separator of claim 25 wherein the period of ageing of step (d) is from about 30 to 60 minutes.

27. The battery separator of claim 25 wherein the precipitated silica of step (e) is recovered from the slurry, washed to a residual alkali metal salt content of less than about 2.5 weight percent and dried.

28. The battery separator of claim 27 wherein the washed precipitated silica is dried by spray drying or rotary drying.

29. The battery separator of claim 27 wherein the washed precipitated silica is dried by spray drying and milled to produce a product having a median agglomerate particle size of between about 12 and about 16 micrometers.

30. The battery separator of claim 27 wherein the acidifying agent is sulfuric acid and the recovered precipitated silica is washed to a residual alkali metal sulfate salt content of less than about 2 weight percent.

31. The battery separator of claim 1 wherein between 20 and about 75 weight percent of the siliceous filler, basis the polymeric material, is used to prepare the separator.

32. The battery separator of claim 31 wherein the polymeric material is selected from natural rubber, styrene-butadiene rubber, nitrile-butadiene rubber, polyisoprene, high molecular weight polyethylene, polypropylene, polybutene, ethylene-propylene copolymers, polyvinyl chloride and vinyl chloride-vinyl acetate copolymers.

33. The battery separator of claim 32 wherein between about 30 and about 60 weight percent of the siliceous filler, basis the polymeric material, is used to prepare the separator.

34. Amorphous, precipitated silica prepared by the sequential steps of:

(a) establishing an agitated aqueous solution of alkali metal silicate having (1) an initial alkali metal oxide concentration of from about 2.1 to 2.6 grams per liter and a temperature of from about 179° F. to 186° F., or (2) an initial alkali metal oxide concentration of from about 5.6 to 7.2 grams per liter and a temperature of between about 190° F. and about 198° F., (b) adding slowly to the said aqueous solution further alkali metal silicate in amounts if (1) from about 14.5 to about 19 times, or (2) from about 2 to about 5 times, basis the aforesaid respective initial alkali metal oxide concentration, the amount of alkali metal silicate initially present in the aqueous solution while simultaneously adding acidifying agent to the said aqueous solution in amounts sufficient to maintain the alkali metal oxide concentration in the aqueous solution at substantially its initial level, thereby to form an aqueous slurry of precipitated silica, (c) adding additional acidifying agent to the slurry of step (b) until the pH thereof is from about 8 to about 9, (d) ageing the slurry of step (c) at (1) between about 176° F. and 186° F., or (2) between about 188° F. and 198° F., basis the aforesaid respective initial temperatures of the initial aqueous alkali metal silicate solution, for from about 15 to 90 minutes, and thereafter (e) adding additional acidifying agent to the slurry of step (d) in amounts such that the final solid silica product has an essentially neutral pH.

35. The silica of claim 34 wherein the alkali metal silicate is sodium silicate.

36. The silica of claim 35 wherein the acidifying agent is selected from the group consisting of carbonic acid, hydrochloric acid and sulfuric acid.

37. The silica of claim 36 wherein the amount of additional acidifying agent added to the slurry of step (d) is sufficient to reduce the pH thereof to from about 3.8 to about 4.7.

38. The silica of claim 36 wherein the precipitated silica of step (e) is recovered from the slurry, washed to a residual alkali metal salt content of less than about 2.5 weight percent and dried.

39. The silica of claim 38 wherein the washed precipitated silica is dried by spray drying or rotary drying.

40. The silica of claim 39 wherein the dried silica is milled to produce a product having a median agglomerate particle size of between about 12 and about 16 micrometers.

41. Amorphous, precipitated silica prepared by the sequential steps of:

(a) establishing an aqueous solution of alkali metal silicate having an initial alkali metal oxide concentration of from about 2.1 to 2.6 grams per liter and a temperature of between about 179° F. and about 186° F.

(b) adding slowly to the said aqueous solution further alkali metal silicate in amounts of from about 14.5 to about 19 times the amount of alkali metal silicate initially present in the aqueous solution while simultaneously adding acidifying agent to the said aqueous solution in amounts sufficient to maintain the alkali metal oxide concentration in the aqueous solution at substantially its initial level, thereby to form an aqueous slurry of precipitated silica, (c) adding additional acidifying agent to the slurry of step (b) until the pH thereof is from about 8 to about 9, (d) ageing the slurry of step (c) at between about 176° F. and 186° F. for from about 15 to 90 minutes, and thereafter (e) adding additional acidifying agent to the slurry of step (d) in amounts such that the final solid product has an essentially neutral pH.

42. The silica of claim 41 wherein the alkali metal silicate is sodium silicate.

43. The silica of claim 42 wherein the acidifying agent is selected from the group consisting of carbonic acid, hydrochloric acid and sulfuric acid.

44. The silica of claim 43 wherein the amount of additional acidifying agent added to the slurry of step (d) is sufficient to reduce the pH thereof to from about 3.8 to about 4.7.

45. The silica of claim 44 wherein the precipitated silica of step (e) is recovered from the slurry, washed to a residual alkali metal salt content of less than about 2.5 weight percent and dried.

46. The silica of claim 45 wherein the washed precipitated silica is dried by spray drying or rotary drying.

47. The silica of claim 42 wherein the initial alkali metal oxide concentration is between about 2.1 and 2.2 grams per liter, the temperature thereof is from about 182° F. to about 183° F., the amount of further alkali metal silicate added in step (b) is from about 15 to 17 times the amount of alkali metal silicate initially present in the aqueous solution, the acidifying agent is sulfuric acid, the precipitated silica is aged in step (d) for from about 30 to 60 minutes, the precipitated silica of step (e) is recovered and washed to a residual sulfate salt content of less than about 2.0 weight percent, and the washed silica dried in a rotary furnace and milled to provide a product having a median agglomerate particle size of between about 12 and 15 micrometers.

48. Amorphous, precipitated silica prepared by the sequential steps of:

(a) establishing an aqueous solution of alkali metal silicate having an initial alkali metal oxide concentration of from about 5.6 to 7.2 grams per liter and a temperature of between about 190° F. and about 198° F., (b) adding slowly to the said aqueous solution further alkali metal silicate in amounts of from about 2 to about 5 times the amount of alkali metal silicate initially present in the aqueous solution while simultaneously adding acidifying agent to the said aqueous solution in amounts sufficient to maintain the alkali metal oxide concentration in the aqueous solution at substantially its initial level, thereby to form an aqueous slurry of precipitated silica, (c) adding additional acidifying agent to the slurry of step (b) until the pH thereof is from about 8 to about 9

(d) ageing the slurry of step (c) at between about 188° F. and 198° F. for from about 15 to 90 minutes, and thereafter (e) adding additional acidifying agent to the slurry of step (d) in amounts such that the final solid product has an essentially neutral pH.

49. The silica of claim 48 wherein the alkali metal silicate is sodium silicate.

50. The silica of claim 49 wherein the initial alkali metal oxide concentration is between about 5.6 and 6.3 grams per liter.

51. The silica of claim 49 wherein the initial alkali metal oxide concentration is about 7.0 grams per liter.

52. The silica of claim 50 wherein the temperature of the aqueous alkali metal silicate solution of step (a) is about 195° F.

53. The silica of claim 50 wherein the amount of further alkali metal silicate added in step (b) is from about 2 to 3 times the amount of alkali metal silicate initially present in the solution of step (a).

54. The silica of claim 49 wherein the acidifying agent is carbonic acid, hydrochloric acid or sulfuric acid.

55. The silica of claim 53 wherein the acidifying agent is carbonic acid, hydrochloric acid or sulfuric acid.

56. The silica of claim 55 wherein the amount of additional acidifying agent added to the slurry of step (d) is sufficient to reduce the pH thereof to from about 3.8 to 4.7, and the period of ageing of step (d) is from about 30 to 60 minutes.

57. The silica of claim 56 wherein the precipitated silica of step (e) is recovered from the slurry, washed to a residual alkali metal salt content of less than about 2.5 weight percent and dried.

58. The silica of claim 57 wherein the washed precipitated silica is dried by spray drying or rotary drying.

59. The battery separator of claim 57 wherein the washed precipitated silica is dried by spray drying and milled to produce a product having a median agglomerate particle size of between about 12 and about 16 micrometers.

60. The silica of claim 54 wherein the precipitated silica of step (e) is recovered, washed to a residual alkali metal salt content of less than about 2.5 weight percent and spray dried.

61. The silica of claim 60 wherein the amount of additional acidifying agent added to the slurry of step (d) is sufficient to reduce the pH thereof to from about 3.8 to 4.7 and the acidifying agent is sulfuric acid.

62. The silica of claim 58 wherein the acidifying agent is carbonic acid, hydrochloric acid or sulfuric acid.

63. The silica of claim 62 wherein the acidifying agent is sulfuric acid and the precipitated silica of step (e) is recovered, washed to a residual alkali metal salt content of less than 2.5 weight percent and spray dried.

64. The silica of claim 44 wherein the acidifying agent is sulfuric acid and the precipitated silica of step (e) is recovered, washed to a residual alkali metal salt content of less than 2.5 weight percent and rotary dried.

* * * * *